(12) United States Patent
Aida et al.

(10) Patent No.: US 7,171,608 B2
(45) Date of Patent: Jan. 30, 2007

(54) DATA PLAYBACK EQUIPMENT FOR PLAYING BACK DATA RECORDED ON A DISK MEDIUM

(75) Inventors: Kazutoshi Aida, Osaka (JP); Toshihiko Takahashi, Osaka (JP); Ryuusuke Horibe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 428 days.

(21) Appl. No.: 10/664,882

(22) Filed: Sep. 22, 2003

(65) Prior Publication Data

US 2004/0059986 A1    Mar. 25, 2004

(30) Foreign Application Priority Data

Sep. 20, 2002    (JP) ............................ 2002-275597

(51) Int. Cl.
*H03M 13/03* (2006.01)

(52) U.S. Cl. .................. 714/794; 714/795; 714/796; 375/262; 375/341

(58) Field of Classification Search ............. 714/794, 714/791, 795; 375/262, 341
See application file for complete search history.

(56) References Cited

U.S. PATENT DOCUMENTS 6,292,450 B1    9/2001    Kim 6,476,992 B1 *  11/2002   Shimatani ............... 360/46
6,563,889 B1 *  5/2003    Shih et al. .............. 375/341
6,819,514 B1 *  11/2004   Behrens et al. .......... 360/65
6,836,511 B1 *  12/2004   Marukawa ............... 375/232

FOREIGN PATENT DOCUMENTS

| JP | 8-45081 | 2/1996 |
|---|---|---|
| JP | P2000-173060 A | 6/2000 |
| JP | P2001-23167 A | 1/2001 |

* cited by examiner

*Primary Examiner*—Albert Decady
*Assistant Examiner*—Esaw Abraham
(74) *Attorney, Agent, or Firm*—McDermott Will & Emery LLP

(57) ABSTRACT

In playback of data recorded on an optical disk, an error minimization circuit holds a plurality of ideal values for partial response (PR) equalization as equalization targets, and updates tap coefficients of a finite impulse response (FIR) filter so that the errors between the outputs of the FIR filter reflecting the output of an analog-to-digital converter (ADC) and the equalization targets are minimized. An error detection circuit and an addition/weighting circuit generate a signal representing the errors between the outputs of the FIR filter and the equalization targets as a parameter signal correlated with the error rate of played-back data. The quality of the analog signal is adjusted so that the parameter signal is minimized, to thereby optimize the margin of the error rate of played-back data.

7 Claims, 3 Drawing Sheets

DATA PLAYBACK EQUIPMENT FOR PLAYING BACK DATA RECORDED ON A DISK MEDIUM

BACKGROUND OF THE INVENTION

The present invention relates to data playback equipment for playing back data recorded an a disk medium, such as an optical disk drive and a hard disk drive.

The error rate of played-back data is conventionally used as a yardstick for the quality of a signal played back by data playback equipment, and reducing the error rate is important. However, under use of the error correction technology such as error correcting code (ECC), system breakdown will occur if the error limit is exceeded even slightly, while no error arises at all within the error limit.

In data playback equipment, it is very difficult to execute learning for system optimization using the error rate of played-back data as a parameter. Conventionally, therefore, to optimize the margin of the error rate, the jitter amount is detected from an analog signal obtained from a disk medium, and learning is executed using the jitter amount (see Japanese Laid-Open Patent Publication No. 8-45081, No. 2000-173060 and No. 2001-23167).

The jitter amount is a very useful parameter for determining the margin of the error rate. However, with introduction of technologies such as partial response maximum likelihood (PRML) and adaptive equalization thanks to the recent advance of the digital technology, the jitter amount is no more a parameter always correlated with the error rate. In this situation, a new parameter replacing the jitter amount used in the conventional analog-related techniques is required.

SUMMARY OF THE INVENTION

An object of the present invention is providing a parameter useful for securing the margin of the err r rate of played-back data, replacing the conventional jitter amount used for information playback equipment.

To attain the above object, according to the present invention, an analog signal obtained from a disk medium is converted to a digital value, and the error between the digital value and its ideal value is used as a new parameter.

Specifically, the present invention is directed to data playback equipment for playing back data recorded on a disk medium, including analog-to-digital conversion means for converting an analog signal obtained from the disk medium to a digital value; target holding means for holding an ideal value for a signal related to an output of the analog-to-digital conversion means as a target; and error detection means for detecting an error between the signal related to the output of the analog-to-digital conversion means and an output of the target holding means and generating a signal representing the error as a parameter signal correlated with an error rate of played-back data, wherein the quality of the analog signal is adjusted so that the parameter signal is minimized, to thereby optimize the margin of the error rate of played-back data.

The data playback equipment may further includes: a filter receiving the output of the analog-to-digital conversion means, the filter having taps of which coefficients are variable; and error minimization means for updating the tap coefficients of the filter so that an error between an output of the filter and the output of the target holding means is minimized. By having these means, the tap coefficients of the filter are first optimized, and then the quality of the analog signal can be adjusted so that the parameter signal is minimized.

The filter may be a partial response (PR) equalization filter for realizing PR equalization. The target holding means may hold a plurality of ideal values for the PR equalization as targets. The error detection means and the error minimization means may respectively compare a plurality of tap outputs of the filter reflecting the output of the analog-to-digital conversion means with the plurality of ideal values.

DESCRIPTION OF THE PREFERRED EMBODIMENTS

Figure 1:
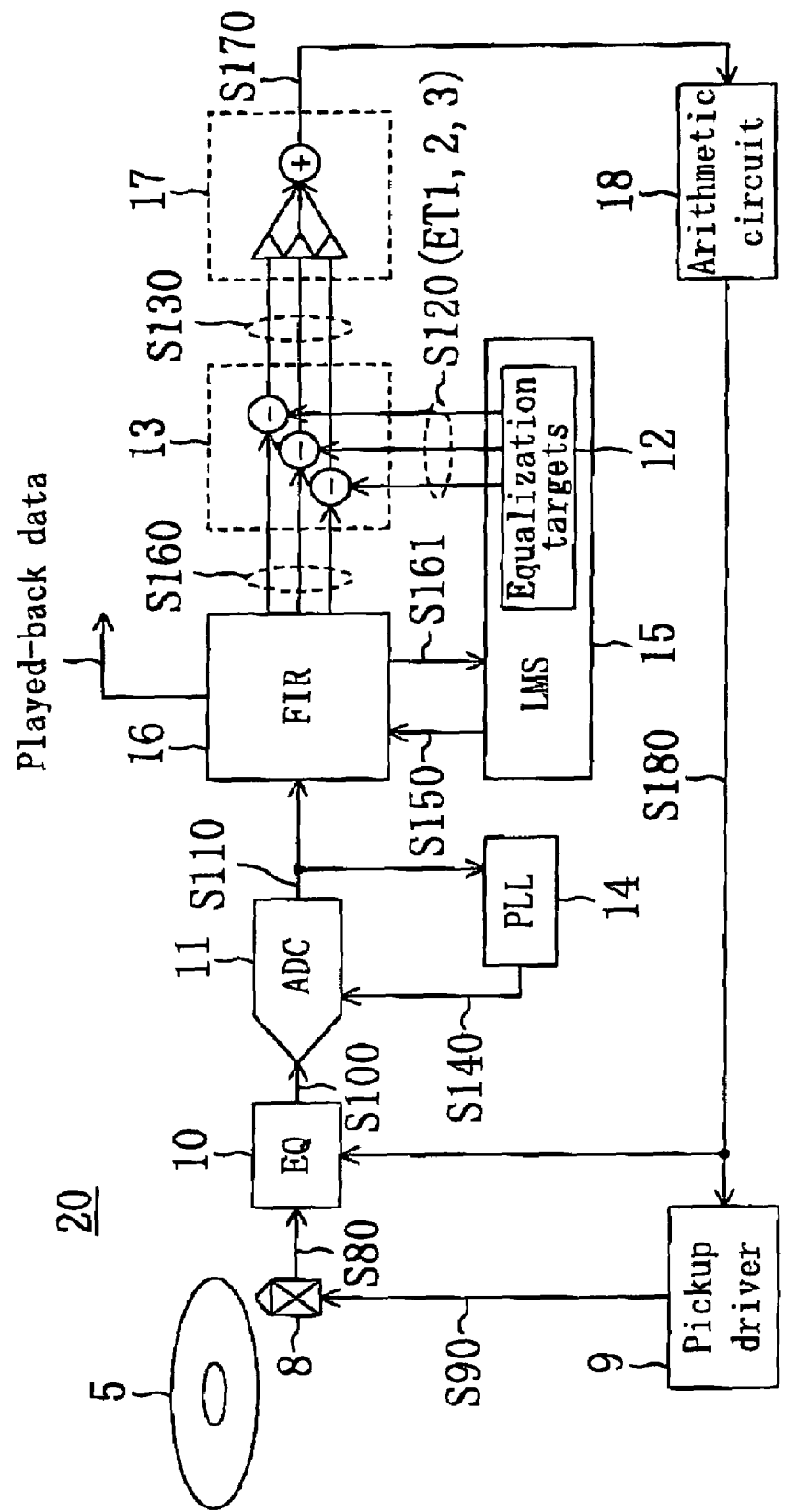
FIG. 1 is a block diagram showing a configuration of information playback equipment of the present invention.

FIG. 1 shows a configuration of an optical disk drive 20 as the data playback equipment of the present invention. The optical disk drive 20 of FIG. 1, which is data playback equipment for playing back data recorded on an optical disk 5 as a disk medium, includes a pickup 8, a pickup driver 9, an equalizer (EQ) 10, an analog-to-digital converter (ADC) 11, a target holding circuit 12, an error detection circuit 13, a phase-locked loop (PLL) circuit 14, an error minimization circuit 15, a PR equalization filter 16, an addition/weighting circuit 17 and an arithmetic circuit 18. In the illustrated example, a 3-tap finite impulse response (FIR) filter is used as the PR equalization filter 16, and a least mean square (LMS) block according the method of least squares is used as the error minimization circuit 15.

The pickup 8 is a means for irradiating the optical disk 5 with a laser beam. The pickup driver 9 sends a control signal S90 to the pickup 8 to control focusing and tracking of the laser beam. The equalizer 10 receives an output signal S80 of the pickup 8 and outputs an analog signal S100. The ADC 11 converts the analog signal S100 to a digital signal S110, which is given to the PLL circuit 14 and the FIR filter 16. The PLL circuit 14 extracts a clock from the digital signal S110 and supplies the extracted clock to the ADC 11 as the sampling clock The FIR filter 16, receiving the digital signal S110, has three taps of which coefficients are variable. The output of the FIR filter 16 is used as the played-back data.

The target holding circuit 12 holds a plurality of ideal values for PR equalization as targets. Assume herein that the target holding circuit 12 holds three equalization targets (ET1, ET2 and ET3) prepared for three tap outputs of the FIR filter 16. The LMS block 15 compares three tap outputs S161 of the FIR filter 16 reflecting the sequentially changing output of the ADC 11 with the respective equalization targets (ET1, ET2 and ET3), and supplies a signal S150 to the FIR filter 16 for updating the tap coefficients of the FIR filter 16 so that the square errors between the tap outputs and the targets are minimized. The error detection circuit 13 compares three tap outputs S160 of the FIR filter 16 reflecting the sequentially changing output of the ADC 11 with the equalization targets (ET1, ET2 and ET3) represented by signals S120, detects the errors between the tap outputs and the targets with three subtract rs, and outputs signals representing the detected errors as error signals S130 related with the error rate of played-back data. The addition/weighting circuit 17, composed of three multipliers and one adder, performs arbitrary weighting and addition for the outputs S130 of the error detection circuit 13, to thereby obtain a parameter signal S170. The arithmetic circuit 18 supplies a quality adjustment signal S180 obtained based on the parameter signal S170 to the pickup driver 9 and the equalizer 10. That is, the arithmetic circuit 18 has a function of optimizing the margin of the error rate of the played-back data by adjusting the quality of the analog signal S100 so that the parameter signal S170 is minimized. The output signals S160 and S161 of the FIR filter 16 may be the same signals.

Figure 2:
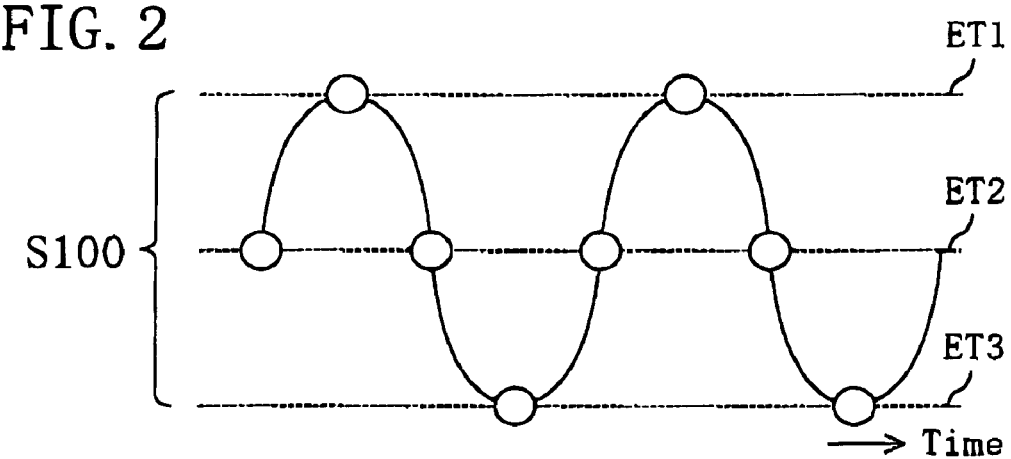
FIG. 2 is a view showing a waveform of an analog signal input into an ADC in FIG. 1 and its ideal sample points.
Figure 3:
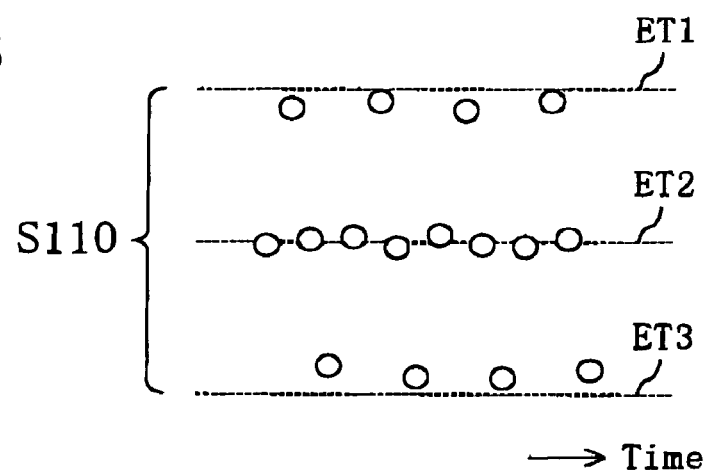
FIG. 3 is a view demonstrating that sample points represented by an output digital signal of the ADC in FIG. 1 are actually deviated from equalization targets.
Figure 4:
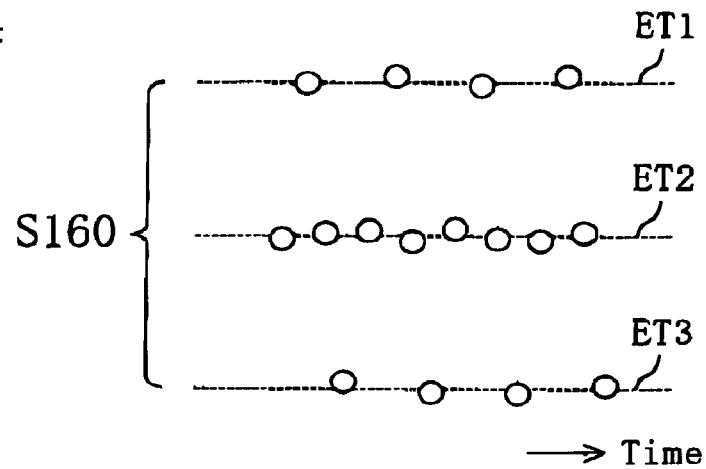
FIG. 4 is a view demonstrating that an output signal of a FIR filter in FIG. 1 has been corrected by an LMS block.
Figure 5:
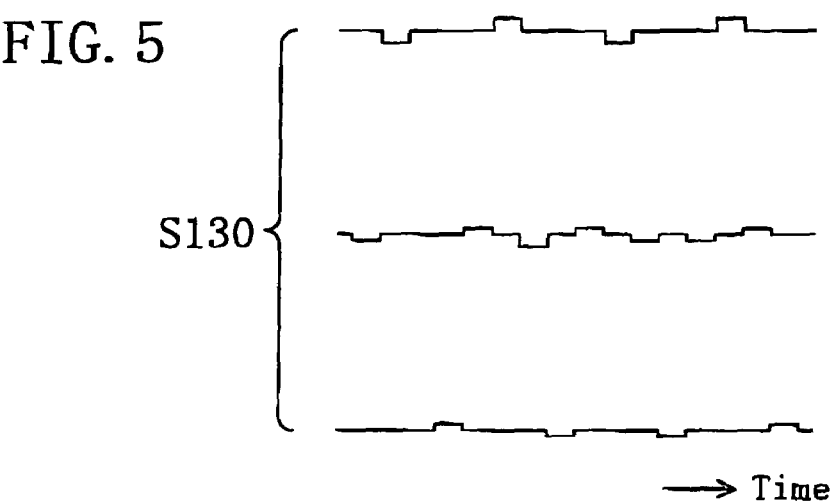
FIG. 5 is a view showing waveforms of error signals output from an error detection circuit in FIG. 1.
Figure 6:
FIG. 6 is a view showing a waveform of a parameter signal output from an addition/weighting circuit in FIG. 1.

The operation of the optical disk drive 20 of FIG. 1 will be described with reference to FIGS. 2 to 6. FIG. 2 shows the waveform of the analog signal S100 input into the ADC 11 and its ideal sample points. In FIG. 2, each sample point corresponds with one of the equalization targets (ET1, ET2 and ET3). Actually, however, as shown in FIG. 3, sample points represented by the digital signal S110 output from the ADC 11 are deviated from the equalization targets (ET1, ET2 and ET3). In view of this fact, the LMS block 15 updates the tap coefficients of the FIR filter 16 so that the square errors between the three tap outputs S161 of the FIR filter 16 and the equalization targets (ET1, ET2 and ET3) are minimized. FIG. 4 shows successful correction of the three tap outputs S160 of the FIR filter 16 by the LMS block 15. In response to the corrected three tap outputs S160, the error detection circuit 13 outputs the error signals S130 as shown in FIG. 5. The addition/weighting circuit 17 generates the parameter signal S170 based on the received error signals S130. FIG. 6 shows the waveform of the parameter signal S170 obtained when all the multiplication factors are 1. The arithmetic circuit 18 controls the pickup driver 9 and the equalizer 10 so that the parameter signal S170 is minimized, to thereby optimize the margin of the error rate of the played-back data.

Thus, with the optical disk drive 20 having the configuration shown in FIG. 1, it is possible to execute learning for the focusing and tracking control of the pickup 8 and the characteristic adjustment of the equalizer 10, to optimize the margin of the error rate. This learning may be executed for an arbitrary sector or an arbitrary track of the optical disk 5. The parameter signal S170 may be accumulated at a frequency proportional to the clock frequency of the PLL circuit 14, or a signal obtained by adding the parameter signal S170 and a jitter signal at a predetermined ratio may be accumulated, to permit stable learning irrespective of a variation in rotation of the optical disk 5.

As a simpler configuration, the digital signal S110 may be directly sent to the error detection circuit 13 omitting the placement of the PR equalization filter 16 and the error minimization circuit 15 in FIG. 1. Alternatively, a low pass filter (LPF) that is not meant for waveform equalization may be adopted in place of the PR equalization filter 16. The error detection circuit 13 may compute the accumulated values of the differences between the filter output signals S160 and the targets S120.

In the case of use of the PR equalization filter 16 as in FIG. 1, all the error signals S130 output from the error detection circuit 13 may be used as parameters correlated with the error rate, or only one output (for example, the median value) may be selected by the addition/weighting circuit 17. Otherwise, the sum of arbitrary two outputs or the sum of at least three or all the outputs may be used by the addition/weighting circuit 17 as a parameter.

The arithmetic circuit 18 may use the parameter signal S170 as information indicating the quality of the optical disk 5. This will be described with reference to FIG. 7.

Figure 7:
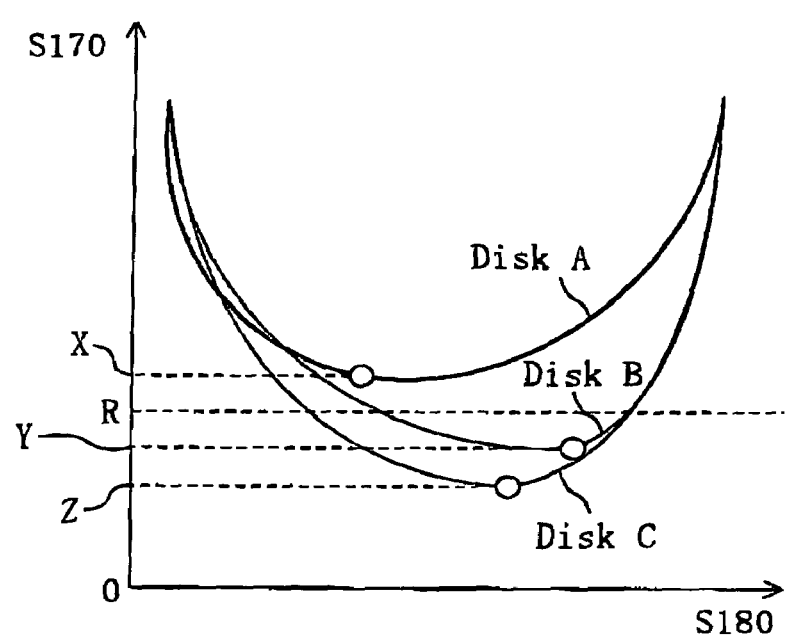
FIG. 7 is a view demonstrating pass/fail decision on the quality of a disk medium by the information playback equipment of FIG. 1.

FIG. 7 shows the correlation between the quality adjustment signal S180 and the parameter signal S170 obtained during adjustment of the quality of the analog signal S100 for each of three disks A, B and C. The disks A, B and C can provide the highest quality of played-back data when the quality of the analog signal is adjusted with the minimum values X, Y and Z, respectively. As for the disk A, in which the minimum value X is greater than a criterion R, it is decided that the medium is defective. As for the disk B, in which the minimum value Y is smaller than the criterion R, it is decided that the medium is not defective but the optical disk drive 20 suffers a breakdown in an event that playback of data on the disk B by the optical disk drive 20 fails. The same quality pass/fail decision as that for the disk B is made for the disk C.

As described above, in an event that playback of data by the optical disk drive 20 fails, which is responsible for this failure, the optical disk 5 or the optical disk drive 20, can be easily determined by using the parameter signal S170, without the necessity of complicate signal analysis. This improves debugging performance.

The functions of the arithmetic circuit 18 may be implemented by a personal computer or the like externally connected to the optical disk drive 20.

As described above, the data playback equipment of the present invention can provide a useful parameter replacing the conventional jitter amount, and is valuable in the fields of optical disk drives, hard disk drives and the like.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. Data playback equipment for playing back data recorded on a disk medium, comprising:
analog-to-digital conversion means for converting an analog signal obtained from the disk medium to a digital value;
target holding means for holding an ideal value for a signal related to an output of the analog-to-digital conversion means as a target;
error detection means for detecting an error between the signal related to the output of the analog-to-digital conversion means and an output of the target holding means and generating a signal representing the error as a parameter signal correlated with an error rate of played-back data;

a filter receiving the output of the analog-to-digital conversion means, the filter having taps of which coefficients are variable; and error minimization means for updating the tap coefficients of the filter so that an error between an output of the filter and the output of the target holding means is minimized, wherein the quality of the analog signal is adjusted so that the parameter signal is minimized, to thereby optimize the margin of the error rate of played-back data.

2. The data playback equipment of claim 1, wherein the filter is a partial response (PR) equalization filter for realizing PR equalization, the target holding means holds a plurality of ideal values for the PR equalization as targets, and the error detection means and the error minimization means respectively compare a plurality of tap outputs of the filter reflecting the output of the analog-to-digital conversion means with the plurality of ideal values.

3. The data playback equipment of claim 2, further comprising addition means for giving the sum of arbitrary two outputs among a plurality of outputs of the error detection means.

4. The data playback equipment of claim 2, further comprising addition means for giving the sum of at least three or all outputs among a plurality of outputs of the error detection means.

5. The data playback equipment of claim 2, further comprising weighting means for performing arbitrary weighting for a plurality of outputs of the error detection means.

6. The data playback equipment of claim 5, wherein the weighting means has a function of outputting only a median value among the plurality of outputs of the error detection means.

7. The data playback equipment of claim 1, further comprising means for using the parameter signal as information indicating the quality of the disk medium.

* * * * *